United States Patent
Sato et al.

(10) Patent No.: US 9,406,935 B2
(45) Date of Patent: Aug. 2, 2016

(54) ANODE ACTIVE MATERIAL AND METAL ION BATTERY PREPARED THEREWITH

(71) Applicants: Shigeki Sato, Fujinomiya (JP); Masafumi Nose, Susono (JP); Hideki Nakayama, Susono (JP)

(72) Inventors: Shigeki Sato, Fujinomiya (JP); Masafumi Nose, Susono (JP); Hideki Nakayama, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 11 days.

(21) Appl. No.: 14/345,776

(22) PCT Filed: Oct. 9, 2012

(86) PCT No.: PCT/JP2012/076123
§ 371 (c)(1),
(2) Date: Mar. 19, 2014

(87) PCT Pub. No.: WO2013/061770
PCT Pub. Date: May 2, 2013

(65) Prior Publication Data
US 2014/0227598 A1    Aug. 14, 2014

(30) Foreign Application Priority Data

Oct. 25, 2011 (JP) .................. 2011-233487
Jun. 28, 2012 (JP) .................. 2012-145530

(51) Int. Cl.
*H01M 4/58*      (2010.01)
*H01M 4/525*    (2010.01)
(Continued)

(52) U.S. Cl.
CPC .............. *H01M 4/525* (2013.01); *C01F 7/002* (2013.01); *C01F 7/762* (2013.01); *C01G 49/009* (2013.01);
(Continued)

(58) Field of Classification Search
CPC . H01M 4/525; H01M 4/5825; H01M 10/052; H01M 10/054
See application file for complete search history.

(56) References Cited

U.S. PATENT DOCUMENTS 4,489,043 A * 12/1984 Bowerman ............. C01G 45/10
                                                             423/49
5,258,168 A    11/1993 Misra
(Continued)

FOREIGN PATENT DOCUMENTS

CN       1659728 A      8/2005
FR       2703834 A1 * 10/1994 .............. H01M 4/36
(Continued)

OTHER PUBLICATIONS

"Utah's Potash Resources and Activity", Andrew Rupke, Sep. 2012. Downloaded on Sep. 8, 2015 from http://files.geology.utah.gov/surveynotes/articles/pdf/potash_resources_44-3.pdf.*
(Continued)

*Primary Examiner* — Kenneth Douyette
(74) *Attorney, Agent, or Firm* — Oliff PLC

(57) ABSTRACT

A main object of the present invention is to provide an anode active material capable of increasing energy density at the same time increasing battery safety, and a metal ion battery prepared with the anode active material. The present invention is an anode active material including an element that belongs to alunite group capable to insert and remove an ion(s) of at least one metal element selected from the group consisting of alkali metal elements and alkaline-earth metal elements, and a metal ion battery having a cathode, an anode, and an electrolyte filled between the cathode and the anode, the electrolyte conducting a metal ion(s), wherein the anode active material is contained in the anode.

12 Claims, 12 Drawing Sheets

(51) Int. Cl.
  *H01M 10/052* (2010.01)
  *H01M 10/054* (2010.01)
  *C01G 49/00* (2006.01)
  *C01F 7/00* (2006.01)
  *C01F 7/76* (2006.01)

(52) U.S. Cl.
  CPC .......... *H01M 4/5825* (2013.01); *H01M 10/052* (2013.01); *H01M 10/054* (2013.01); *C01P 2002/72* (2013.01); *H01M 2220/30* (2013.01); *Y02E 60/122* (2013.01); *Y02T 10/7011* (2013.01)

(56) References Cited

U.S. PATENT DOCUMENTS

| | | | |
|---|---|---|---|
| 5,908,716 A | 6/1999 | Barker | |
| 2003/0027049 A1 | 2/2003 | Barker et al. | |
| 2004/0265695 A1* | 12/2004 | Barker | C01B 25/455 429/231.9 |
| 2006/0194117 A1* | 8/2006 | Paulsen | H01M 4/131 429/300 |
| 2007/0048575 A1* | 3/2007 | McKenzie | H01M 4/244 429/406 |
| 2008/0063939 A1* | 3/2008 | Ryu | H01M 4/133 429/209 |
| 2008/0261113 A1* | 10/2008 | Huang | H01M 4/131 429/221 |
| 2009/0012223 A1 | 1/2009 | Okada et al. | |

FOREIGN PATENT DOCUMENTS

| | | |
|---|---|---|
| JP | A-11-40156 | 2/1999 |
| JP | A-2009-129742 | 6/2009 |
| JP | A-2009-173547 | 8/2009 |
| JP | A-2010-257736 | 11/2010 |
| JP | A-2011-40310 | 2/2011 |
| JP | A-2011-86464 | 4/2011 |

OTHER PUBLICATIONS

Frost et al., "NIR Spectroscopy of Jarosites," Spectrochimica Acta Part A, 2005, vol. 62, pp. 869-874.

* cited by examiner

ANODE ACTIVE MATERIAL AND METAL ION BATTERY PREPARED THEREWITH

TECHNICAL FIELD

The present invention relates to an anode active material and a metal ion battery prepared with the anode active material.

BACKGROUND ART

A lithium-ion secondary battery has characteristics that it has a higher energy density and is operable at a high voltage compared with other secondary batteries. Therefore, it is used for information devices such as cellular phones, as a secondary battery that can be easily reduced in size and weight, and nowadays there is also an increasing demand for the lithium-ion secondary battery to be used as a power source for large-scale apparatuses such as electric vehicles and hybrid vehicles.

The lithium-ion secondary battery comprises a cathode layer and an anode layer, and an electrolyte layer disposed between them. As the electrolyte layer, a non-aqueous liquid (electrolytic solution) and the like is employed.

As a technique related to such a lithium-ion secondary battery, Patent Document 1 for example discloses an anode active material used for a non aqueous lithium-ion secondary battery, the anode active material including a lithium-titanium compound oxide having a spinel structure, represented by a general formula of $LiM_{0.5}Ti_{1.5}O_4$ (M is one or more element (s) selected from the group consisting of Fe, Co, Ni, Mn and Zn), and absorbing and releasing lithium ions, and a lithium-ion secondary battery prepared with the anode active material. Patent Document 2 discloses an anode active material of a lithium-ion secondary battery that is a single phase powder particle of Si including 0.01% or more to 0.40% by mass of B dissolved in solid. Patent Document 3 discloses a lithium-ion secondary battery comprising an anode active material, a cathode active material and a non-aqueous electrolyte, wherein a polycrystalline mesocarbon microsphere-graphitized article having a plurality of crystals and an average particle diameter of 1 to 120 µm, with the C axis direction of each crystal being in random directions is used as the anode active material. Patent Document 4 discloses a lithium-ion secondary battery prepared with an anode active material having a layered lithium iron nitride that is represented by a composition formula of $Li_{3-x}Fe_xN$ (0<x<0.4).

On the other hand, graphite is known as a typical anode active material of a lithium-ion secondary battery, however, in a sodium ion secondary battery in which sodium ions move between a cathode layer and an anode layer, sodium ions are not inserted or removed in between graphite layers. Therefore, graphite cannot be used as an anode active material of a sodium ion secondary battery. Nowadays, it has been found that a hard carbon functions as an anode active material for a sodium ion secondary battery, therefore research and development of the sodium ion secondary battery has been intensely carried out.

As a technique related to such a sodium ion secondary battery, Patent Document 5 for example discloses a non-aqueous electrolyte secondary battery comprising a cathode having a complex oxide that includes sodium and iron as a cathode active material, an anode having a carbon material as a absorbing material for sodium ions and lithium ions, and a non-aqueous electrolyte containing lithium ions and sodium ions. Also, Patent Document 6 discloses a technique related to an anode active material for a sodium ion secondary battery that contains a carbon material and a sodium ion secondary battery in which the anode active material is used in an anode.

CITATION LIST

Patent Literatures

Patent Document 1: Japanese Patent Application Laid-Open Publication No. 2011-86464
Patent Document 2: Japanese Patent Application Laid-Open Publication No. 2011-40310
Patent Document 3: Japanese Patent Application Laid-Open Publication No. 2009-173547
Patent Document 4: Japanese Patent Application Laid-Open Publication No. 2010-257736
Patent Document 5: Japanese Patent Application Laid-Open Publication No. H11-40156
Patent Document 6: Japanese Patent Application Laid-Open Publication No. 2009-129742

SUMMARY OF THE INVENTION

Problems to be Solved by the Invention

An electrode potential to absorb and release lithium ions of the lithium-titanium complex oxide having a spinel structure which is used in the technique disclosed in Patent Document 1 is about 1.5 V on the basis of lithium electrode potential (vs Li/Li+, the same is applied in what follows). Therefore, the lithium-ion secondary battery disclosed in Patent Document 1 has a problem that it has a low battery voltage and tends to have a small energy density, even though it can prevent deposition of metal lithium. As an anode active material that can increase an energy density of a lithium-ion secondary battery, a graphite-based material that absorbs and releases lithium ions at a potential of 0 V on the basis of lithium electrode potential is known. However, if the graphite-based material is used for an anode, metal lithium easily deposits upon charging especially at a low temperature, or charging after charging and discharging are repeated, therefore there is a problem that safety is easily lowered. There has not been suggested yet so far an anode active material that can absorb and release lithium ions at a potential with which metal lithium does not deposit, and at the same time that can provide a lithium ion secondary battery with an increased battery voltage. By using techniques disclosed in Patent Document 1 to Patent Document 4, it is difficult to support preventing deposition of metal lithium and increasing battery voltage at the same time.

On the other hand, an electrode potential to absorb and release sodium ions, the potential of the carbon material used in the techniques disclosed in Patent Documents 5 and 6 is about 0 V on the basis of sodium electrode potential (vs $Na/Na^+$, the same is applied in what follows). Therefore, the sodium-ion secondary batteries disclosed in Patent Documents 5 and 6 have a problem that metal sodium easily deposits at the same time especially upon charging of the batteries under a low temperature or charging after repeated charging and discharging thereby safety is easily lowered.

Accordingly, an object of the present invention is to provide an anode active material capable of increasing battery voltage and battery safety at the same time, and a metal-ion battery prepared with the anode active material.

Means for Solving the Problems

In order to solve the above problems, the present invention takes the following means. Namely, a first aspect of the present invention is an anode active material comprising a material that belongs to alunite group and can insert and remove a ion(s) of at least one metal element selected from the group consisting of alkali metal elements and alkaline-earth metal elements.

Here, the term "a ion(s) of at least one metal element selected from the group consisting of alkali metal elements and alkaline-earth metal elements" refers, for example, at least one kind of ion(s) selected from the group consisting of a lithium ion(s), a sodium ion(s), a potassium ion(s), a magnesium ion(s), and a calcium ion(s). Also, "a material that belongs to alunite group" refers a material in which K and/or Al of alunite: $KAl_3(SO_4)_2(OH)_6$ or $KAl_3(SO_4)_2(OH)_6$ is (are) each substituted to another element. The material that belongs to alunite group is, for example, alunite: $KAl_3(SO_4)_2(OH)_6$, natroalunite: $NaAl_3(SO_4)_2(OH)_6$/ammonioalunite: $(NH_4)Al_3(SO_4)_2(OH)_6$, minamiite: $(Na, Ca, K, \square)Al_3(SO_4)_2(OH)_6$, huangite: $Ca\square Al_6(SO_4)_4(OH)_{12}$, walthierite: $BaAl_6(SO_4)_4(OH)_{12}$, jarosite: $KFe^{3+}_3(SO_4)_2(OH)_6$, natrojarosite: $NaFe^{3+}_3(SO_4)_2(OH)_6$, dorallcharite: $(Tl, K)Fe^{3+}_3(SO_4)_2(OH)_6$, ammoniojarosite: $(NH_4)Fe^{3+}_3(SO_4)_2(OH)_6$, argentojarosite: $AgFe^{3+}_3(SO_4)_2(OH)_6$, plumbojarosite: $PbFe^{3+}_6(SO_4)_4(OH)_{12}$, hydronium jarosite: $(H_3O)Fe^{3+}_3(SO_4)_2(OH)_6$, osarizawaite: $PbCuAl_2(SO_4)_2(OH)_6$, beaverite: $PbCuFe^{3+}_2(SO_4)_2(OH)_6$ and the like can be raised. "$\square$" in the above chemical formulas means a vacant place.

The anode active material according to the first aspect of the present invention is capable to insert and remove an alkali metal ion(s) at a higher potential than an equilibrium potential of alkali metal and alkali metal ions, and capable to insert and remove an alkaline-earth metal ion(s) at a higher potential than an equilibrium potential of alkaline-earth metal and alkaline-earth metal ions. That is, since the anode active material can function as an anode active material in a potential range in which alkali metal and alkaline-earth metal do not deposit, safety can be increased. Also, the anode active material according to the first aspect of the present invention is capable to insert and remove an alkali metal ion(s) and an alkaline-earth metal ion(s) in a lower potential range than a potential range in which a conventional anode active material can be used without alkali metal or alkaline-earth metal deposited, thereby it is possible to increase battery voltage. Therefore, according to the first aspect of the present invention, it is possible to provide an anode active material capable of increasing battery voltage and battery safety at the same time.

Also, in the first aspect of the present invention described above, it is preferable that at least one element selected from the group consisting of lithium, sodium and potassium is included in the alkali metal elements. By including these elements, the anode active material according to the first aspect of the present invention can be used as an anode active material of a lithium ion battery, a sodium ion battery and a potassium ion battery.

Also, in the first aspect of the present invention described above, it is preferable that at least one element selected from the group consisting of magnesium and calcium is included in the alkaline-earth metal elements. By including these elements, the anode active material according to the first aspect of the present invention can be used as an anode active material of a magnesium ion battery and a calcium ion battery.

A second aspect of the present invention is an anode active material comprising a material that belongs to alunite group.

The anode active material according to the second aspect of the present invention is capable to insert and remove an alkali metal ion(s) at a higher potential than an equilibrium potential of alkali metal and alkali metal ions, and capable to insert and remove an alkaline-earth metal ion(s) at a higher potential than an equilibrium potential of alkaline-earth metal and alkaline-earth metal ions. That is, since the anode active material can function as an anode active material in a potential range in which alkali metal and alkaline-earth metal do not deposit, it is possible to increase safety. Also, the anode active material according to the second aspect of the present invention is capable to insert and remove an alkali metal ion(s) and an alkaline-earth metal ion(s) in a lower potential range than a potential range in which a conventional anode active material can be used without alkali metal or alkaline-earth metal deposited, thereby it is possible to increase battery voltage. Therefore, according to the second aspect of the present invention, it is possible to provide an anode active material capable of increasing battery voltage and battery safety at the same time.

Also, when A is defined as at least one kind selected from the group consisting of K, Na, Li, ½Mg, ½Ca, ½Sr, Rb, Ag, Tl, ½Pb, ½Hg, $NH_4$ and $H_3O$, M is defined as at least one kind of element selected from the group consisting of Al, Sc, Ti, V, Cr, Mn, Fe, Co, Ni, Cu, and Zn, and $-1 \leq a, b, c \leq 1$, $-6 \leq d$ and $0 \leq v$, the anode active material according to the first or second aspect of the present invention described above can be represented by chemical formula: $A_{1+a}M_{3+b}(SO_4)_{2+c}(OH)_{6+d} \cdot v(H_2O)$. In such a configuration as well, it is possible to increase battery voltage at the same time increasing battery safety. In the chemical formula, there is a case in which M has a plurality of kinds instead of one kind, and when valence of A is bivalent, $A_{1+a}$ is to be $(½A)_{1+a}$ that is $A_{(1/2+a/2)}$. Also, especially when the anode active material represented by the above chemical formula is a natural mineral and the like, there are different impurities being included.

Also, the anode active material according to the first or second aspect of the present invention described above can be $NaAl_{3.0}(SO_4)_{2.2}(OH)_{5.6} \cdot 0.30H_2O$. In such a configuration as well, it is possible to increase battery voltage at the same time increasing of battery safety.

Also, in the first or second aspect of the present invention described above, the material that belongs to alunite group can be natrojarosite. In such a configuration as well, it is possible to increase battery voltage at the same time increasing battery safety.

Also, the anode active material according to the first or second aspect of the present invention described above can be $NaAl_{1.1}Fe_{1.6}(SO_4)_2(OH)_{5.1} \cdot 0.12H_2O$. In such a configuration as well, it is possible to increase battery voltage at the same time increasing battery safety. Also, a charge-discharge capacity by unit mass of $NaAl_{1.1}Fe_{1.6}(SO_4)_2(OH)_{5.1} \cdot 0.12H_2O$ is larger than a charge-discharge capacity by unit mass of graphite or lithium titanium oxide (hereinafter sometimes referred to as "LTO"). Therefore, by using $NaAl_{1.1}Fe_{1.6}(SO_4)_2(OH)_{5.1} \cdot 0.12H_2O$, it is possible to increase energy density at the same time increasing battery safety.

Also, the anode active material according to the first or second aspect of the present invention described above can be $NaFe_3(SO_4)_2(OH)_6$. In such a configuration as well, it is possible to increase battery voltage at the same time increasing battery safety.

Also, the anode active material according to the first or second aspect of the present invention described above can be $KFe_3(SO_4)_2(OH)_6$. In such a configuration as well, it is possible to increase battery voltage at the same time increasing battery safety.

A third aspect of the present invention is a metal ion battery comprising a cathode, an anode, and an electrolyte filled between the cathode and the anode, which electrolyte conducts a metal ion(s), wherein the anode active material according to the first or second aspect of the present invention described above is contained in the anode.

Here, the "metal ion battery" refers to a battery in which a metal ion(s) move (s) between a cathode and an anode. The metal ion battery includes a lithium-ion battery, a sodium-ion battery, a potassium-ion battery, a calcium-ion battery and a magnesium-ion battery for instance. Also, the metal ion battery can be a primary battery or a secondary battery.

In the third aspect of the present invention, the anode active material according to the first or second aspect of the present invention described above is used in the anode. Therefore, according to the third aspect of the present invention, it is possible to provide a metal ion battery capable of increasing battery voltage at the same time increasing battery safety.

Also, in the third aspect of the present invention described above, the metal ion can be a lithium ion. In such a configuration, it is possible to provide a lithium-ion battery capable of increasing battery voltage at the same time increasing battery safety.

Also, in the third aspect of the present invention described above, the metal ion can be a sodium ion. This configuration makes it possible to provide a sodium-ion battery capable of increasing battery voltage at the same time increasing safety.

Effect of the Invention

According to the present invention, it is possible to provide an anode active material capable of increasing battery voltage at the same time increasing battery safety, and a metal ion battery prepared with the anode active material.

MODES FOR CARRYING OUT THE INVENTION

Figure 1A:
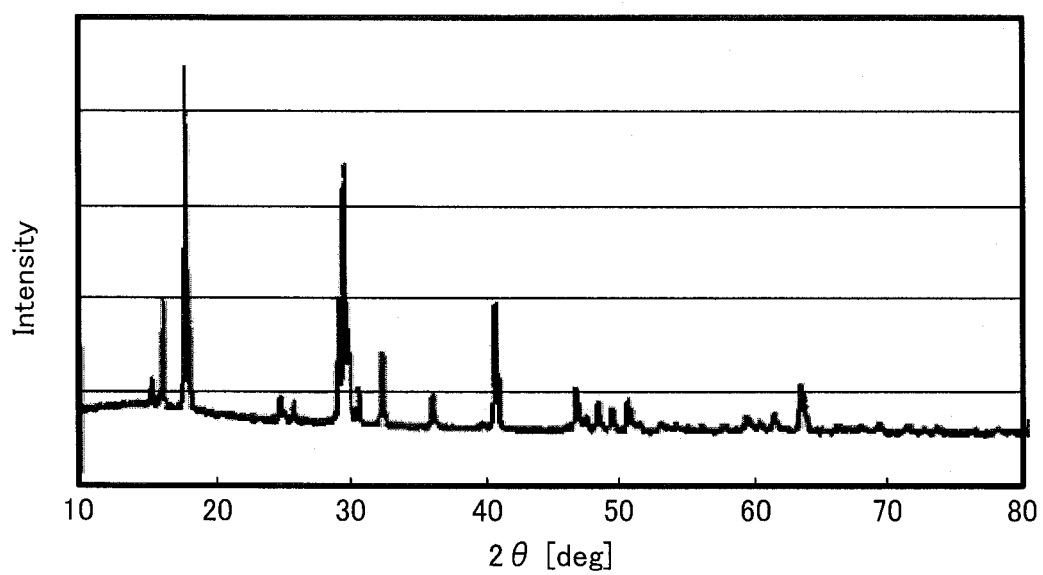
FIG. 1A is a graph showing a result of X-ray diffraction measurement of a powder of Example 1.

By using graphite as an anode active material of a lithium-ion secondary battery, it is possible to increase battery voltage, thereby it is possible to increase energy density of the battery. However, a potential at which lithium ions are inserted to graphite, and a potential at which lithium ions are removed from graphite are close to a potential at which lithium ions deposit as metal lithium. Therefore, if graphite is used to as the anode active material, the metal lithium tends to deposit especially when the battery is charged under a low temperature, and when the battery is charged after repeated charging and discharging, thereby it is needed to have a provision for securing battery safety. Against this, as an anode active material capable to insert and remove lithiums ion at a potential in which lithium ions do not deposit as a metal lithium, LTO and the like have been suggested. By using LTO, it becomes easy to increase battery safety, however, each potential at which lithium ions are inserted to LTO and at which lithium ions are removed from LTO is high as around 1.5 V on the basis of lithium electrode potential. Because of this, if LTO is used, battery voltage tends to be decreased. Also, since charge-discharge capacity of LTO per unit mass is ½ or less of charge-discharge capacity of graphite per unit mass, a battery prepared with LTO has a low energy density. As a battery for equipping to a vehicle, a battery that has a high safety and high energy density is demanded. To satisfy this demand, it is considered that identifying an anode active material capable to be used at a potential with which lithium ions do not deposit as metal lithium and at the same time capable to increase battery voltage is important.

Inventors of the present invention have carried out an intensive study and found out that an anode active material having a material that belongs to alunite group (a material that belongs to alunite group, which material can insert and remove ions of at least one metal element selected from the group consisting of alkali metal elements and alkaline-earth metal elements), for instance, an anode active material having alunite structure as its skeleton structure, an anode active material having natrojarosite structure as its skeleton structure and an anode active material having jarosite structure as its skeleton structure, is capable to be used in a potential range at which lithium ions do not deposit as metal lithium, and at the same time capable to insert and remove a lithium ions at a lower potential than a potential of LTO.

Further, it is found out that when the anode active material is used to an anode of a sodium-ion secondary battery, the sodium-ion secondary battery can operate at a potential range in which sodium ions do not deposit as metal sodium. Nowadays, it is reported that a hard carbon can be used as an anode active material of a sodium-ion secondary battery, however, a potential at which sodium ions are inserted in the hard carbon and a potential at which sodium ions are removed from the hard carbon is around 0 V on the basis of sodium electrode potential. Therefore, in order to increase energy density of a sodium-ion secondary battery prepared with a hard carbon, the sodium-ion secondary battery need to be used at a potential range in which sodium ions deposit as metal sodium. If the sodium-ion secondary battery is used only at a potential range in which metal sodium does not deposit, the energy density is significantly decreased. The inventors of the present invention has carried out an intensive study and found out that the anode active material of the present invention is capable of securing same or more of charge-discharge capacity per unit mass comparing with a capacity obtained when a hard carbon is used, even when the anode active material is used at a potential range in which sodium ions do not deposit as metal sodium.

As described above, the anode active material of the present invention can be used not only as an anode active material of a lithium-ion battery, but also as an anode active material of a sodium-ion battery. This is because the way that lithium ions and sodium ions are inserted in the anode active material of the present invention is same as the way that lithium ions and sodium ions are removed from the anode active material of the present invention. Details of the ways are unknown, but it is presumed that charge-discharge is repeated by a reaction in which a lithium ion(s) or a sodium ion(s) is/are inserted in a vacant site (s) of structure and removed when the battery is discharged, or by a so-called conversion reaction. When the conversion reaction is occurred, there is a possibility that an expression "insert-remove" is not appropriate, however, herein the expression "insert-remove" is used including events that occur in the conversion reaction. When the anode active material of the present invention is applied to a metal ion battery in which potassium ions, magnesium ions or calcium ions move between a cathode layer and an anode layer, similarly to lithium ions or sodium ions, it is considered that potassium ions, magnesium ions, and calcium ions also can be inserted and removed. Therefore, it is considered that the anode active material of the present invention can be applied not only to a lithium-ion battery and a sodium-ion battery, but also to a potassium-ion battery, a magnesium-ion battery and a calcium-ion battery.

The present invention has been made based on the above findings. Hereinafter, the present invention will be described. It should be noted that embodiments shown below are examples of the present invention, and the present invention is not limited to these embodiments.

When A is defined as at least one kind selected from the group consisting of K, Na, Li, ½Mg, ½Ca, ½Sr, Rb, Ag, Tl, ½Pb, ½Hg, NH$_4$ and H$_3$O, M is defined as at least one kind of element selected from the group consisting of Al, Sc, Ti, V, Cr, Mn, Fe, Co, Ni, Cu and Zn, and $-1 \le a$, b, $c \le 1$, $-6 \le d$ and $0 \le v$, the anode active material of the present invention can be represented, for instance, by chemical formula:

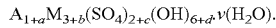

$$A_{1+a}M_{3+b}(SO_4)_{2+c}(OH)_{6+d} \cdot v(H_2O).$$

The reason why a material in which A is not Na is also included in the anode active material of the present invention is that, the material has same structure of the anode active material of the present invention, having a space (s) in the structure, thereby same reaction can be occurred. Even when the reaction is the conversion reaction, since the main reaction is reaction with element M, the reaction can be occurred even when A is not Na.

Also, the reason why a material in which the element M is not Al is also included in the anode active material of the present invention is that, the material has same structure of the anode active material, having a space (s) in the structure, thereby same reaction of the anode active material can be occurred. Even when the reaction is the conversion reaction, since oxides of the above elements can make the conversion reaction, the reaction can be occurred even when the element M is not Al.

Also, since it is inferred that the reaction occurred this time is a reaction in which an ion(s) is/are inserted in or removed from a vacant spaces) of structure or a conversion reaction, it is possible to insert and remove an ion(s) of at least one metal element selected from the group consisting of alkali metal elements and alkaline-earth metal elements, even though Fe is not included in the anode active material of the present invention. However, in view of having a configuration in which the energy density is easy to be increased and the like, it is preferable that Fe is included in the anode active material of the present invention.

The anode active material of the present invention can be used for an anode of a metal ion battery that comprises a cathode, an anode, and an electrolyte filled between the cathode and the anode, which electrolyte conducts a metal ion(s). As the metal ion conducted by the electrolyte and moving between the cathode and the anode, a lithium ion, a sodium ion, a potassium ion, a magnesium ion, a calcium ion and the like can be exemplified. That is, the anode active material of the present invention can be used for each anode of a lithium-ion battery, a sodium-ion battery, a potassium-ion battery, a magnesium-ion battery, a calcium-ion battery and the like.

In the metal ion battery of the present invention, a cathode active material to be contained in the cathode can be adequately selected from cathode active materials that correspond to metal ions to be moved between the cathode and the anode. When the metal ion battery of the present invention is a lithium-ion battery, as a cathode active material, a known cathode active material, for instance, a layered active material such as a lithium cobalt oxide (LiCoO$_2$), lithium nickel oxide (LiNiO$_2$) and the like, an olivine type active material such as olivine type lithium iron phosphate (LiFePO$_4$) and the like, a spinel type active material such as spinel type lithium manganese oxide (LiMn$_2$O$_4$) and the like can be adequately used. Also, when the metal ion battery of the present invention is a sodium-ion battery, as a cathode active material, a known cathode active material such as sodium iron oxide (NaFeO$_2$), fluorinated sodium iron phosphate (Na$_2$FePO$_4$F) and the like can be adequately used. When the metal ion battery of the present invention is a potassium-ion battery, a magnesium-ion battery, or a calcium-ion battery, as a cathode active material, cathode active materials respectively capable to be applied to the batteries can be used.

The cathode of the metal ion battery of the present invention is not limited as long as at least a cathode active material is contained in the cathode, and other than the cathode active material, a binder to bond the cathode active material and other materials, an electrical conducting material to improve electrical conductivity and the like can be contained. For example, when the metal ion battery of the present invention is a lithium-ion battery, as a solid electrolyte that can be contained in the cathode, a sulfide type solid electrolyte such as Li$_3$PS$_4$, Li$_2$S—P$_2$S$_5$ that is produced by mixing Li$_2$S and P$_2$S$_5$ can be exemplified. When a solid electrolyte is contained in the cathode, a configuration of the solid electrolyte is not particularly limited, and the electrolyte can be a crystalline solid electrolyte, an amorphous solid electrolyte, glass ceramics, and polymer electrolyte such as polyethylene oxide (PEO), polyvinylidenefluoride-hexafluoropropylene copolymer (PVdF-HFP) and the like. Also, as a binder that can be contained in the cathode, styrene-butadiene rubber (SBR), polyvinylidene fluoride (PVdF) and the like can be exemplified. As an electrical conductive material that can be contained in the cathode, a carbon material such as a vapor-grown carbon fiber, a carbon black and the like, and a metal material that can endure environment in which the battery is used can be exemplified.

The anode of the metal ion battery of the present invention is not limited as long as the anode contains the anode active material of the present invention, and other than the anode active material, a solid electrolyte, a binder to bond the anode active material and other materials, an electrical conductive material to improve electrical conductivity and the like can be contained. As a solid electrolyte, a binder and an electrical conductive material that can be contained in the anode, same materials as a solid electrolyte, a binder, and an electrical conductive material that can be contained in the cathode can be exemplified. When an electrical conductive material is to be contained in the anode, additive amount of the electrical conductive material is, in view of making effect of improving electron conductivity easy to be exerted and the like, 10% or more of weight of the anode including the electrical conductive material, and in view of making inhibiting decreasing of capacity and the like, 80% or less of weight of the anode including the electrical conductive material. The additive amount of the electrical conductive material is preferably 20% or more to 60% or less of the weight of the anode including the electrical conductive material.

In the metal ion battery of the present invention, the anode can be produced, for example, by undergoing the step of applying a composition for anode that contains the anode active material of the present invention to a base material (an anode current collector and the like mentioned below) and drying the composition. When the anode is produced by undergoing the step of applying the composition for anode to the base material, as an applying method, a doctor blade method, an electrostatic coating method, a dip coating method, a spray coating method and the like can be used. On the other hand, the cathode of the metal ion battery of the present invention can be produced for example by undergoing the step of applying a composition for cathode that contains a cathode active material to a base material (a cathode current collector and the like mentioned below) and drying the composition.

The cathode and the anode of the metal ion battery of the present invention can be connected respectively to a cathode current collector and an anode current collector configured by an electrical conductive material. As the electrical conductive material that can configure the cathode current collector and the anode current collector, a metal material that includes one or two or more of element (s) selected from the group consisting of Cu, Ni, Al, V, Au, Pt, Mg, Fe, Ti, Co, Cr, Zn, Ge, and In can be exemplified. Also, the cathode current collector and the anode current collector can be formed, for example, in a metal foil, metal mesh and the like, and a foam metal can be used for the cathode current collector and the anode current collector.

The electrolyte of the metal ion battery of the present invention is not limited as long as the electrolyte has a conductivity of metal ions moving between the cathode and the anode, and an electrolyte that corresponds to metal ions moving between the cathode and the anode can be adequately selected. The electrolyte can be a liquid electrolyte (hereinafter referred to as "electrolytic solution"), a gel-like electrolyte, or a solid electrolyte. For example, when the metal ion battery of the present invention is a lithium-ion battery or a sodium-ion battery, and an electrolytic solution is used, as a solvent for the electrolytic solution, ethylene carbonate (EC), dimethyl carbonate (DMC), ethylmethyl carbonate (EMC), diethyl carbonate (DEC), propylene carbonate (PC) and the like can be exemplified. Also, when the metal ion battery of the present invention is a lithium-ion battery and an electrolytic solution is used, as a supporting electrolyte that can be used, $LiPF_6$, $LiClO_4$, LiTFSA and the like can be exemplified, and when the metal ion battery of the present invention is a sodium-ion battery and an electrolytic solution is used, as a supporting electrolyte that can be used, $NaPF_6$, $NaClO_4$, NaTFSA and the like can be exemplified. Also, when the metal ion battery of the present invention is a lithium-ion battery and a solid electrolyte is used, as a solid electrolyte that can be used, the above solid electrolyte that can be contained in the cathode, and polymer electrolyte such as PEO can be exemplified. When a gel-like electrolyte is used, an electrolyte in which the above electrolytic solutions are contained in the PVdF-HFP copolymer and the like can be used.

When an electrolytic solution is applied to the metal ion battery of the present invention, the electrolytic solution is applied with a configuration in which the electrolytic solution is impregnated in a separator configured of a porous organic material or porous inorganic material. For the metal ion battery of the present invention, a known separator such as a separator of single-layer polypropylene, a separator of single-layer polyethylene, a polypropylene (PP)/polyethylene (PE)/polypropylene (PP) laminated film and the like can be adequately used. Also, a polymer electrolyte and a solid electrolyte each can be replaced as the separator.

EXAMPLES

With reference to Examples, the present invention will be described more specifically.

1. Production of Sample 1.1. Example 1

Preparation of Anode Active Material

In order to obtain $NaAl_{1.1}Fe_{1.6}(SO_4)_2(OH)_{5.1} \cdot 0.12H_2O$, aluminum sulfate, iron sulfate and sodium sulfate were dissolved in pure water, and agitating the water, sodium hydroxide solution was delivered by drops into the water. The resultant solution was poured into an autoclave apparatus to make reaction under a temperature of 150° C. for 1 hour. Then the solution was cooled to a room temperature and filtered, and washed with 1 L of pure water. After that, the resultant was dried for 24 hours thereby a powder of Example 1 ($NaAl_{1.1}Fe_{1.6}(SO_4)_2(OH)_{5.1} \cdot 0.12H_2O$) was obtained.

<Production of Anode>

By putting the anode active material, carbon black and PVdF in a dispersant (N-methyl-2-pyrrolidone) with the amount thereof being the powder of Example 1:carbon black:PVdF=60:35:5 by weight ratio of solid content and mixing them, a composition in slurry form (hereinafter, referred to as a "first composition") was produced. The first composition produced as above was applied to a copper foil (current collector) and rolled after the composition was dried, to thereby an anode of Example 1 was produced.

<Production of Battery>

A CR2032 type coin battery (a lithium-ion secondary battery. Hereinafter, sometimes referred to as a "battery of Example 1") was produced with the anode of Example 1 as an anode, a lithium metal for an opposite pole, a polypropylene (PP)/polyethylene (PE)/polypropylene (PP) laminated film as a separator, and an electrolytic solution in which a supporting electrolyte (1 mol/L-$LiPF_6$) was dissolved in a solvent in which 1:1 of ethylene carbonate (EC) and diethyl carbonate (DEC) by volume ratio were mixed.

1.2. Example 2

Preparation of Anode Active Material

In order to obtain $NaAl_{3.0}(SO_4)_{2.2}(OH)_{5.6} \cdot 0.30H_2O$, aluminum sulfate and sodium sulfate were dissolved in pure water, and agitating the water, sodium hydroxide solution was delivered by drops into the water. The resultant solution was poured into an autoclave apparatus to make reaction under a temperature of 150° C. for 1 hour. Then the solution was cooled to a room temperature and filtered, and washed with 1 L of pure water. After that, the resultant was dried under a temperature of 80° C. for 24 hours thereby a powder of Example 2 ($NaAl_{3.0}(SO_4)_{2.2}(OH)_{5.6} \cdot 0.30H_2O$) was obtained.

<Production of Anode>

By putting the anode active material, carbon black and PVdF in a dispersant (N-methyl-2-pyrrolidone) with the amount thereof being the powder of Example 2:carbon black: PVdF=60:35:5 by weight ratio of solid content and mixing them, a composition in slurry form (hereinafter, referred to as a "second composition") was produced. The second composition produced as above was applied to a copper foil (current collector) and rolled after the composition was dried, to thereby an anode of Example 2 was produced.

<Production of Battery>

A CR2032 type coin battery (a lithium-ion secondary battery. Hereinafter, sometimes referred to as a "battery of Example 2") was produced with the anode of Example 2 as an anode, a lithium metal for an opposite pole, a polypropylene (PP)/polyethylene (PE)/polypropylene (PP) laminated film as a separator, and an electrolytic solution in which a supporting electrolyte (1 mol/L-$LiPF_6$) was dissolved in a solvent in which 1:1 of ethylene carbonate (EC) and diethyl carbonate (DEC) by volume ratio were mixed.

1.3. Example 3

Production of Battery

A CR2032 type coin battery (a sodium-ion battery. Hereinafter, sometimes referred to as a "battery of Example 3") was produced with the anode of Example 1 as an anode, a sodium metal for an opposite pole, a polypropylene (PP)/polyethylene (PE)/polypropylene (PP) laminated film as a separator, and an electrolytic solution in which a supporting electrolyte (1 mol/L-$NaPF_6$) was dissolved in a solvent in which 1:1 of ethylene carbonate (EC) and diethyl carbonate (DEC) by volume ratio were mixed.

1.4. Example 4

Preparation of Anode Active Material

In order to obtain $NaFe_3(SO_4)_2(OH)_6$, iron sulfate and sodium sulfate were dissolved in pure water, and agitating the water, sodium hydroxide solution was delivered by drops into the water. The resultant solution was poured into an autoclave apparatus to make reaction under a temperature of 120° C. for 24 hour. Then the solution was cooled to a room temperature and filtered, and washed with 1 L of pure water. After that, the resultant was dried under a temperature of 80° C. for 24 hours thereby a powder of Example 4 ($NaFe_3(SO_4)_2(OH)_6$) was obtained.

<Production of Anode>

By putting the anode active material, carbon black and PVdF in a dispersant (N-methyl-2-pyrrolidone) with the amount thereof being the powder of Example 4:carbon black: PVdF=60:35:5 by weight ratio of solid content and mixing them, a composition in slurry form was produced. The composition produced as above was applied to a copper foil (current collector) and rolled after the composition was dried, to thereby an anode of Example 4 was produced.

<Production of Battery>

A CR2032 type coin battery (a lithium-ion secondary battery. Hereinafter, sometimes referred to as a "battery of Example 4") was produced with the anode of Example 4 as an anode, a lithium metal for an opposite pole, a polypropylene (PP)/polyethylene (PE)/polypropylene (PP) laminated film as a separator, and an electrolytic solution in which a supporting electrolyte (1 mol/L-$LiPF_6$) was dissolved in a solvent in which 1:1 of ethylene carbonate (EC) and diethyl carbonate (DEC) by volume ratio were mixed.

1.5. Example 5

Preparation of Anode Active Material

In order to obtain $KFe_3(SO_4)_2(OH)_6$, iron sulfate and potassium sulfate were dissolved in pure water, and agitating the water, potassium hydroxide solution was delivered by drops into the water. The resultant solution was poured into an autoclave apparatus to make reaction under a temperature of 120° C. for 24 hour. Then the solution was cooled to a room temperature and filtered, and washed with 1 L of pure water. After that, the resultant was dried under a temperature of 80° C. for 24 hours thereby a powder of Example 5 ($KFe_3(SO_4)_2(OH)_6$) was obtained.

<Production of Anode>

By putting the anode active material, carbon black and PVdF in a dispersant (N-methyl-2-pyrrolidone) with the amount thereof being the powder of Example 5:carbon black: PVdF=60:35:5 by weight ratio of solid content and mixing them, a composition in slurry form was produced. The composition produced as above was applied to a copper foil (current collector) and rolled after the composition was dried, to thereby an anode of Example 5 was produced.

<Production of Battery>

A CR2032 type coin battery (a lithium-ion secondary battery. Hereinafter, sometimes referred to as a "battery of Example 5") was produced with the anode of Example 5 as an anode, a lithium metal for an opposite pole, a polypropylene (PP)/polyethylene (PE)/polypropylene (PP) laminated film as a separator, and an electrolytic solution in which a supporting electrolyte (1 mol/L-$LiPF_6$) was dissolved in a solvent in which 1:1 of ethylene carbonate (EC) and diethyl carbonate (DEC) by volume ratio were mixed.

1.6. Example 6

Production of Anode

By putting the anode active material, carbon black and PVdF in a dispersant (N-methyl-2-pyrrolidone) with the amount thereof being the powder of Example 4:carbon black: PVdF=60:35:5 by weight ratio of solid content and mixing them, a composition in slurry form was produced. The composition produced as above was applied to a copper foil (current collector) and rolled after the composition was dried, to thereby an anode of Example 6 was produced.

<Production of Battery>

A CR2032 type coin battery (a sodium-ion secondary battery. Hereinafter, sometimes referred to as a "battery of Example 6") was produced with the anode of Example 6 as an anode, a sodium metal for an opposite pole, a polypropylene (PP)/polyethylene (PE)/polypropylene (PP) laminated film as a separator, and an electrolytic solution in which a supporting electrolyte (1 mol/L-$NaPF_6$) was dissolved in a solvent in which 1:1 of ethylene carbonate (EC) and diethyl carbonate (DEC) by volume ratio were mixed.

1.7. Example 7

Production of Anode

By putting the anode active material, carbon black and PVdF in a dispersant (N-methyl-2-pyrrolidone) with the amount thereof being the powder of Example 5:carbon black: PVdF=60:35:5 by weight ratio of solid content and mixing them, a composition in slurry form was produced. The composition produced as above was applied to a copper foil (current collector) and rolled after the composition was dried, to thereby an anode of Example 7 was produced.

<Production of Battery>

A CR2032 type coin battery (a sodium-ion secondary battery. Hereinafter, sometimes referred to as a "battery of Example 7") was produced with the anode of Example 7 as an anode, a sodium metal for an opposite pole, a polypropylene (PP)/polyethylene (PE)/polypropylene (PP) laminated film as a separator, and an electrolytic solution in which a supporting electrolyte (1 mol/L-$NaPF_6$) was dissolved in a solvent in which 1:1 of ethylene carbonate (EC) and diethyl carbonate (DEC) by volume ratio were mixed.

2. Measurement

X-ray Diffraction Measurement

Figure 1B:
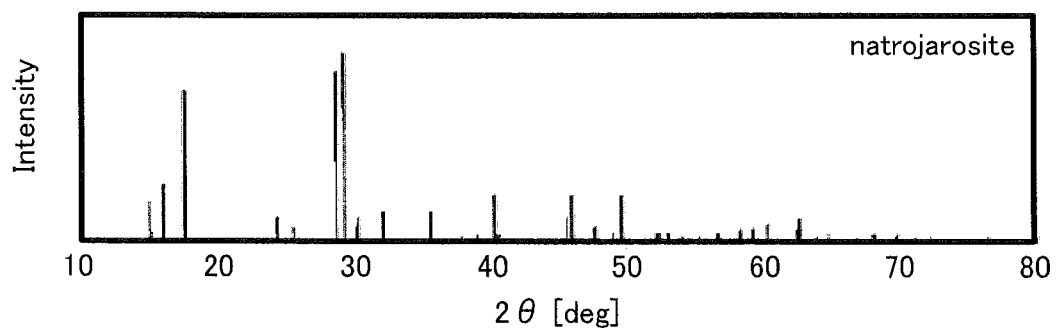
FIG. 1B is a graph showing X-ray diffraction pattern of natrojarosite.
Figure 1C:
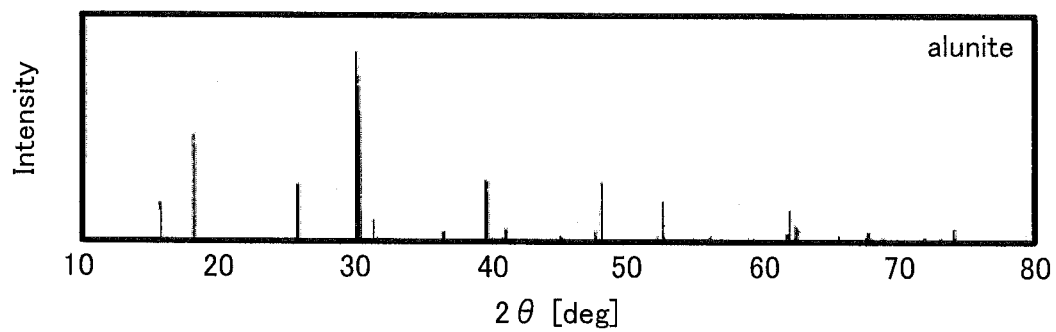
FIG. 1C is a graph showing X-ray diffraction pattern of alunite.

Crystal structure of Example 1 was identified by X-ray diffraction. Result of the diffraction is shown in FIG. 1A. Also, X-ray diffraction Pattern of natrojarosite: $NaFe^{3+}_3(SO_4)_2(OH)_6$ was shown in FIG. 1B, and X-ray diffraction pattern of alunite: $KAl_3(SO_4)_2(OH)_6$ was shown in FIG. 1C. From FIG. 1A to FIG. 1C, the result of X-ray diffraction measurement of the powder of Example 1 (FIG. 1A) corresponded to FIG. 1B. The result of measurement of the powder of Example 2 corresponded to FIG. 1C. Therefore, it was found out that the powder of Example 1 has the crystal structure of natarojarosite, and the powder of Example 2 has the crystal structure of alunite. Both of the powders of Example 1 and 2 are configured by inexpensive elements. Therefore, according to the present invention, it is possible to reduce manufacturing cost of an anode active material, and by applying the anode active material of the present invention, it is also possible to reduce manufacturing cost of a battery.

<Battery Performance Measurement>

Figure 2:
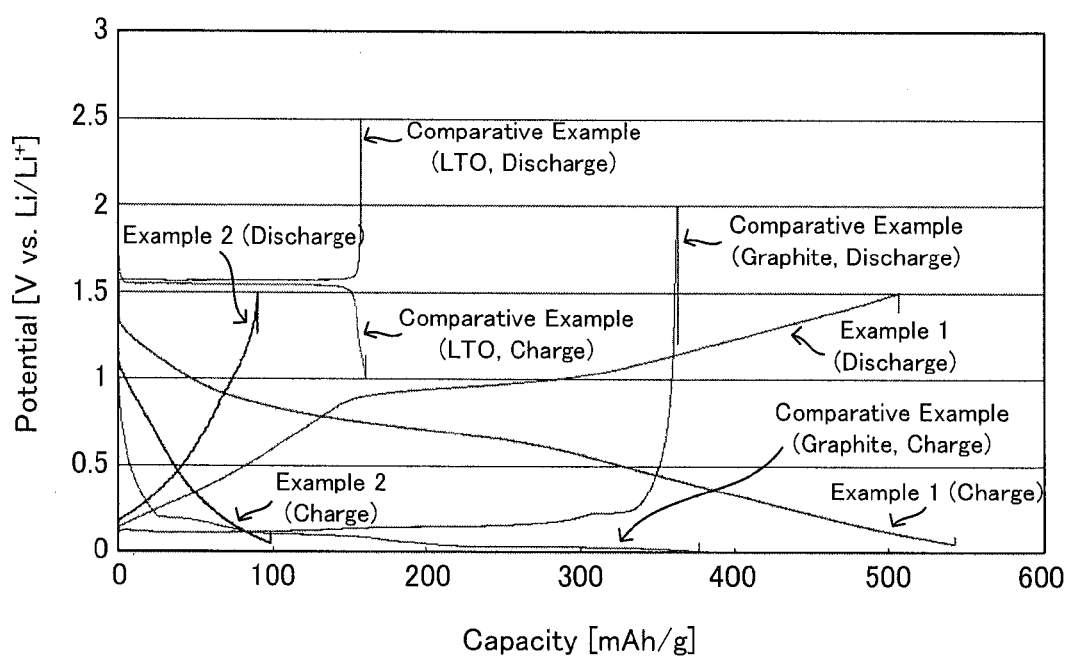
FIG. 2 is a graph showing results of constant current charge-discharge of a lithium-ion secondary battery prepared with the powder of Example 1 and a lithium-ion secondary battery prepared with the powder of Example 2.

Constant current charge-discharge was carried out to each of the battery of Example 1, the battery of Example 2 and the battery of Example 3 produced by the above steps, under a temperature of 25° C., with a load current of 70 mA/g (active material), a voltage range of 0.05V or more to 1.5V or less (to the battery of Example 1 and the battery of Example 2, 0.05V or more to 1.5V or less on the basis of lithium electrode potential, to the battery of Example 3, 0.05V or more to 1.5V or less on the basis of sodium electrode potential). Results of the second cycles of the battery of Example 1 and the battery of Example 2 were shown in FIG. 2, and result of the second cycle of the battery of Example 3 was shown in FIG. 3. In FIG. 2, results of the second cycles of a battery prepared with graphite as an anode active material and a battery prepared with $Li_4Ti_5O_{12}$ (LTO) as an anode active material are shown together with the results of the second cycles of the battery of Example 1 and the battery of Example 2, and in FIG. 3, result of the second cycle of a battery prepared with hard carbon as an anode active material is shown together with the result of the second cycle of the battery of Example 3.

As shown in FIG. 2, the battery of Example 1 in which the powder of Example 1 containing Fe was used for the anode operated stably in a range of 0.05V or more to 1.5V or less on the basis of lithium electrode potential. Also, the battery of Example 1 had 500 mAh/g or more of reversible capacity, which means that even when the battery was used in a potential range in which metal lithium does not deposit, the battery was capable of securing a capacity larger than 372 mAh/g, which is a theoretical capacity of graphite. That is, the battery of Example 1 was capable to increase battery safety since it can operate in a potential range in which metal lithium does not deposit, was capable to increase battery voltage since lithium ion is inserted and removed in a potential range lower than that of $Li_4Ti_5O_{12}$, and was capable to increase energy density same or more to a battery prepared with graphite.

As shown in FIG. 2, the battery of Example 2 in which the powder of Example 2 that does not contain Fe operated stably in a range of 0.05V or more to 1.5V or less on the basis of lithium electrode potential. Also, the battery of Example 2 was capable to insert and remove lithium ions at a lower potential than a potential at which lithium ions are inserted in or removed from $Li_4Ti_5O_{12}$. Therefore, the battery of Example 2 is capable to increase battery voltage better than a battery in which $Li_4Ti_5O_{12}$ is used as an anode active material. As shown in FIG. 2, the powder of Example 2 has a lower charge-discharge capacity per unit mass than that of $Li_4Ti_5O_{12}$. Therefore, in view of making a configuration in which safety of a lithium-ion battery can be increased since the battery can operate in a potential range in which metal lithium does not deposit, and at the same time making a configuration in which energy density can be increased same or more to an energy density of an lithium-ion battery prepared with $Li_4Ti_5O_{12}$, it was found out that an anode active material that contains Fe (the powder of Example 1) is preferably used for an anode.

Figure 3:
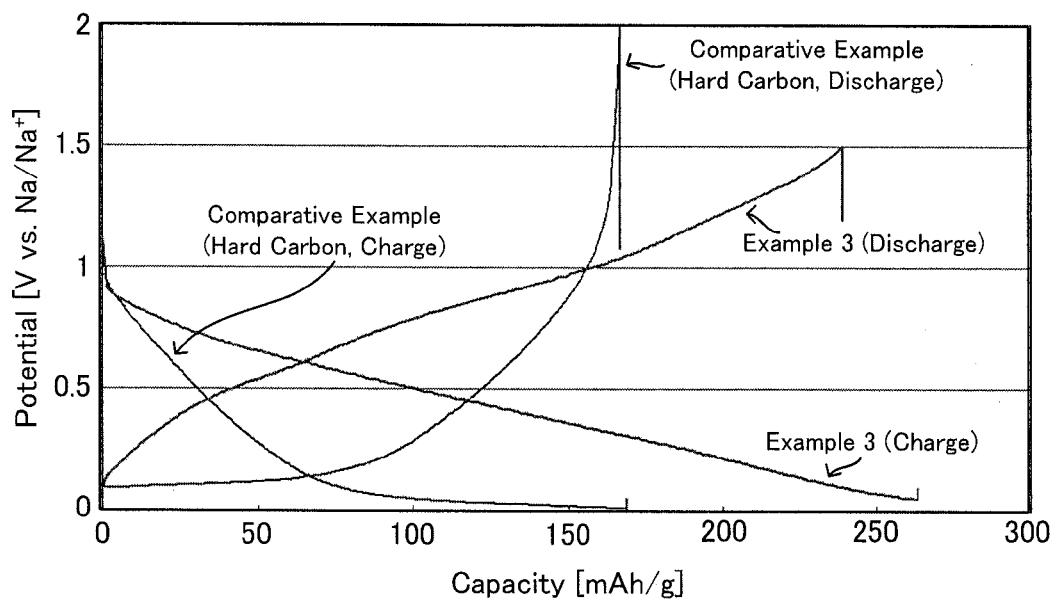
FIG. 3 is a graph showing results of constant current charge-discharge of a sodium-ion secondary battery prepared with the powder of Example 1.

As shown in FIG. 3, the battery of Example 3 in which the powder of Example 1 containing Fe was used for the anode operated stably in a range of 0.05V or more to 1.5V or less on the basis of sodium electrode potential. Also, the battery of Example 3 had 250 mAh/g or more of reversible capacity. That is, the battery of Example 3, since it can operate in a potential range in which metal sodium does not deposit, was capable to increase battery safety and at the same time was capable to increase energy density than a battery prepared with a hard carbon.

<X-Ray Diffraction Measurement>

Figure 4:
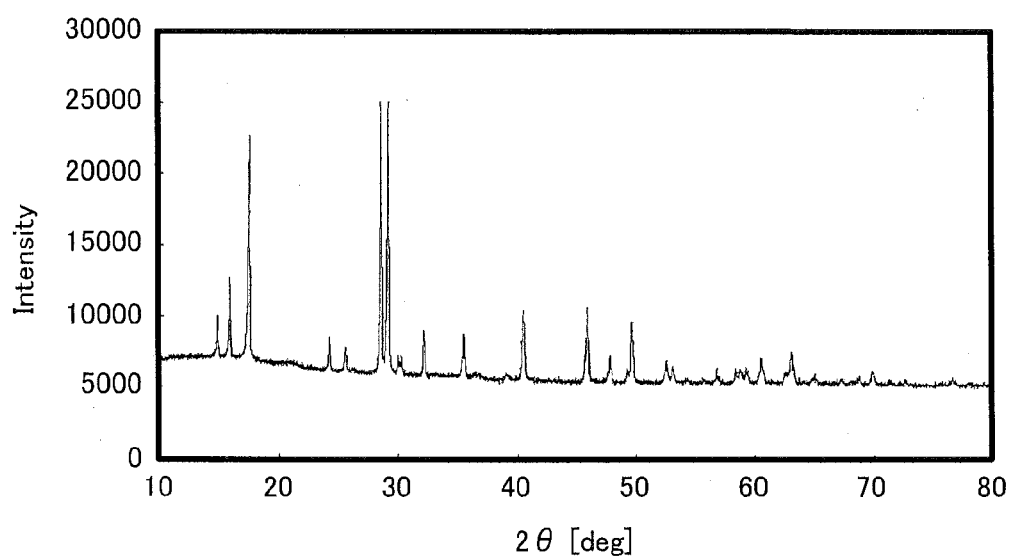
FIG. 4 is a graph showing a result of X-ray diffraction measurement of a powder of Example 4.

Crystal structure of Example 4 was identified by X-ray diffraction. Result of the diffraction is shown in FIG. 4. From FIG. 4 and FIG. 1B, the result of X-ray diffraction measurement of the powder of Example 4 (FIG. 4) corresponded to FIG. 1B. Therefore, it was found out that the powder of Example 4 has the crystal structure of natarojarosite $NaFe_3(SO_4)_2(OH)_6$. The powder of Example 4 is configured by inexpensive elements. Therefore, according to the present invention, it is possible to reduce manufacturing cost of an anode active material, and by applying the anode active material of the present invention, it is also possible to reduce manufacturing cost of a battery.

<Battery Performance Measurement>

Constant current charge-discharge was carried out to the battery prepared with the powder of Example 4 produced by the same step of Example 1, under a temperature of 25° C., with a load current of 70 mA/g (active material), a voltage range of 0.05V or more to 1.5V or less (on the basis of lithium electrode potential). Result of the first cycle of the battery of Example 4 is shown in FIG. 5.

Figure 5:
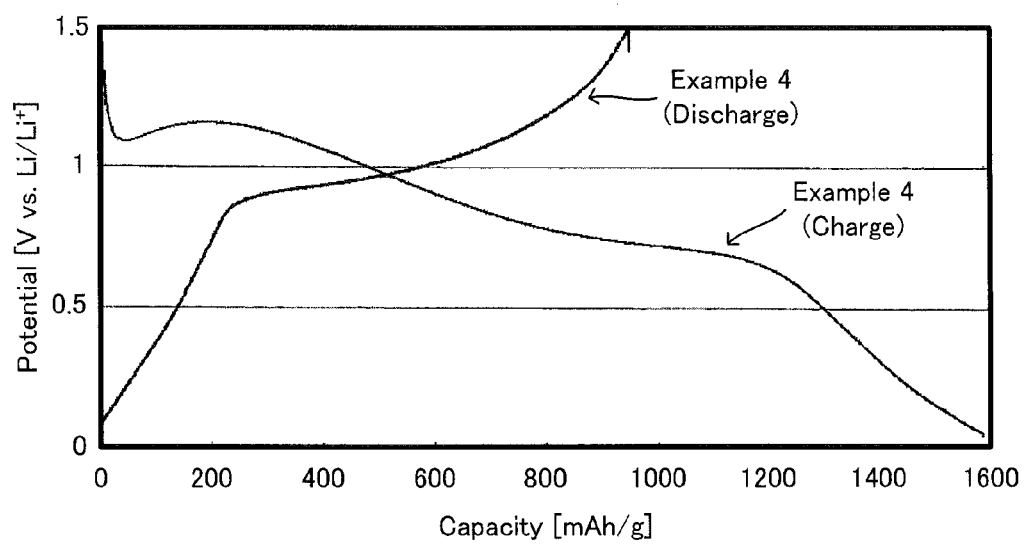
FIG. 5 is a graph showing results of constant current charge-discharge of a lithium-ion secondary battery prepared with the powder of Example 4.

As shown in FIG. 5, the battery of Example 4 operated stably in a range of 0.05V or more to 1.5V or less on the basis of lithium electrode potential. Also, the battery of Example 4 had 500 mAh/g or more of capacity, which means that even when the battery was used in a potential range in which metal lithium does not deposit, the battery was capable of securing a capacity larger than 372 mAh/g, which is a theoretical capacity of graphite. That is, the battery of Example 4 is capable to increase battery safety since it can operate in a potential range in which metal lithium does not deposit. Also, in the battery of Example 4, lithium ions are inserted and removed in a lower potential range than that of $Li_4Ti_5O_{12}$, therefore the battery of Example 4 can increase battery voltage, which makes it possible to increase energy density same or more to a battery prepared with graphite.

<X-Ray Diffraction Measurement>

Figure 6A:
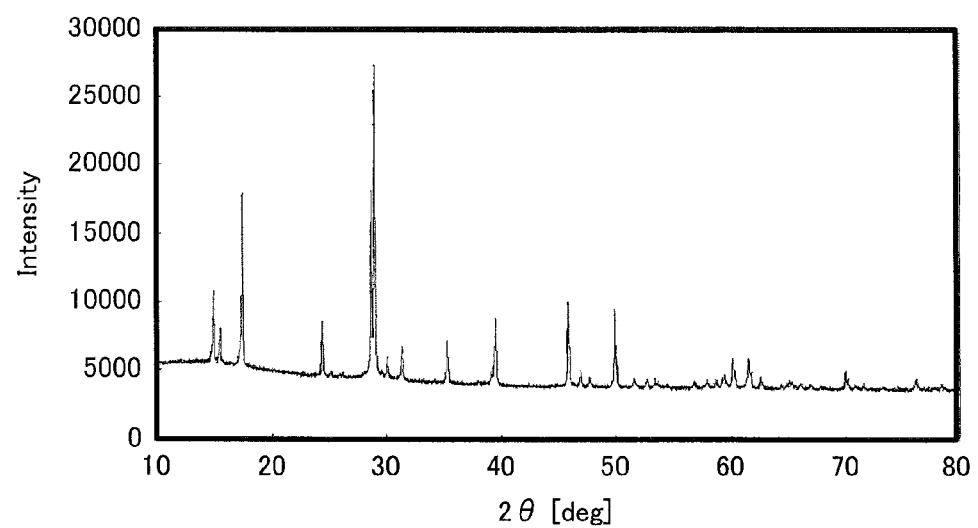
FIG. 6A is a graph showing a result of X-ray diffraction measurement of a powder of Example 5.
Figure 6B:
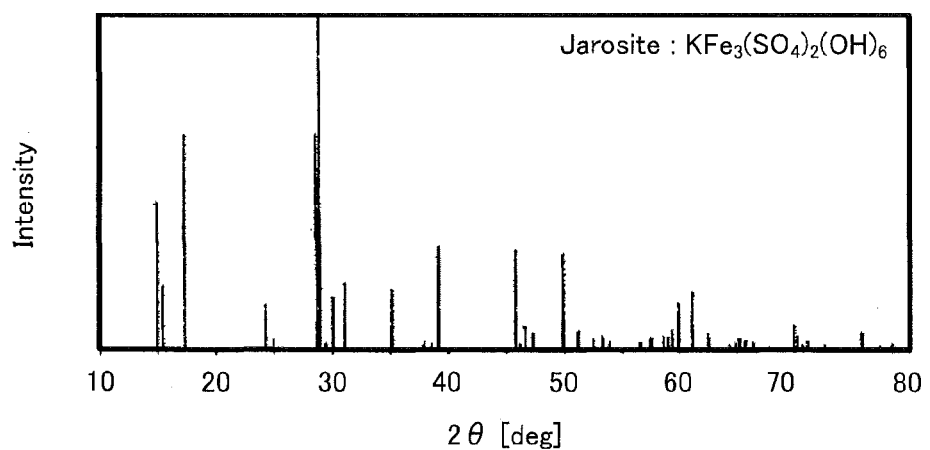
FIG. 6B is a graph showing X-ray diffraction pattern of jarosite.

Crystal structure of Example 5 was identified by X-ray diffraction. Result of the diffraction of the powder of Example 5 is shown in FIG. 6A. Also, the X-ray diffraction pattern of jarosite: $KFe_3(SO_4)_2(OH)_6$ is shown in FIG. 6B. From FIGS. 6A and 6B, the result of X-ray diffraction measurement of the powder of Example 5 (FIG. 6A) corresponded to FIG. 6B. Therefore, it was found out that the powder of Example 5 has the crystal structure of jarosite: $KFe_3(SO_4)_2(OH)_6$. The powder of Example 5 is configured by inexpensive elements. Therefore, according to the present invention, it is possible to reduce manufacturing cost of an anode active material, and by applying the anode active material of the present invention, it is also possible to reduce manufacturing cost of a battery.

<Battery Performance Measurement>

Constant current charge-discharge was carried out to the battery prepared with the powder of Example 5 produced by the same step of Example 1, under a temperature of 25° C., with a load current of 70 mA/g (active material), a voltage range of 0.05V or more to 1.5V or less (on the basis of lithium electrode potential). Result of the first cycle of the battery of Example 5 is shown in FIG. 7.

Figure 7:
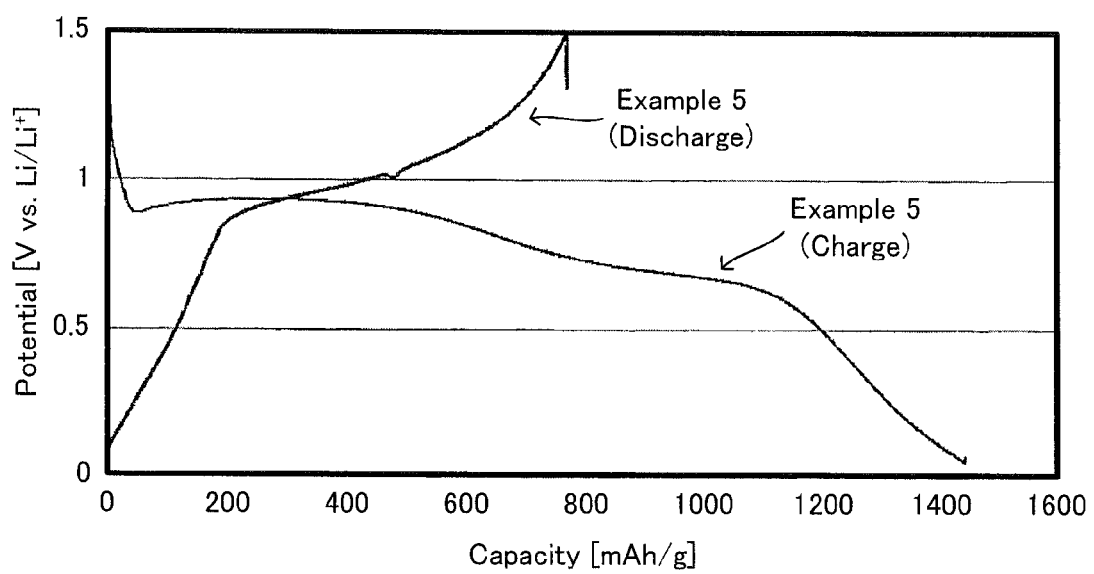
FIG. 7 is a graph showing results of constant current charge-discharge of a lithium-ion secondary battery prepared with the powder of Example 5.

As shown in FIG. 7, the battery of Example 5 operated stably in a range of 0.05V or more to 1.5V or less on the basis of lithium electrode potential. Also, the battery of Example 5 had 500 mAh/g or more of capacity, which means that even when the battery was used in a potential range in which metal lithium does not deposit, the battery was capable of securing a capacity larger than 372 mAh/g, which is a theoretical capacity of graphite. That is, the battery of Example 5 is capable to increase battery safety since it can operate in a potential range in which metal lithium does not deposit. Also, in the battery of Example 5, lithium ions are inserted and removed in a lower potential range than that of $Li_4Ti_5O_{12}$, therefore the battery of Example 5 can increase battery voltage, which makes it possible to increase energy density same or more to a battery prepared with graphite.

<Battery Performance Measurement>

Constant current charge-discharge was carried out to the battery prepared with the powder of Example 4 produced by the same step of Example 3, under a temperature of 25° C., with a load current of 70 mA/g (active material), a voltage range of 0.05V or more to 1.5V or less (on the basis of sodium electrode potential). Result of the first cycle of the battery of Example 6 is shown in FIG. 8.

Figure 8:
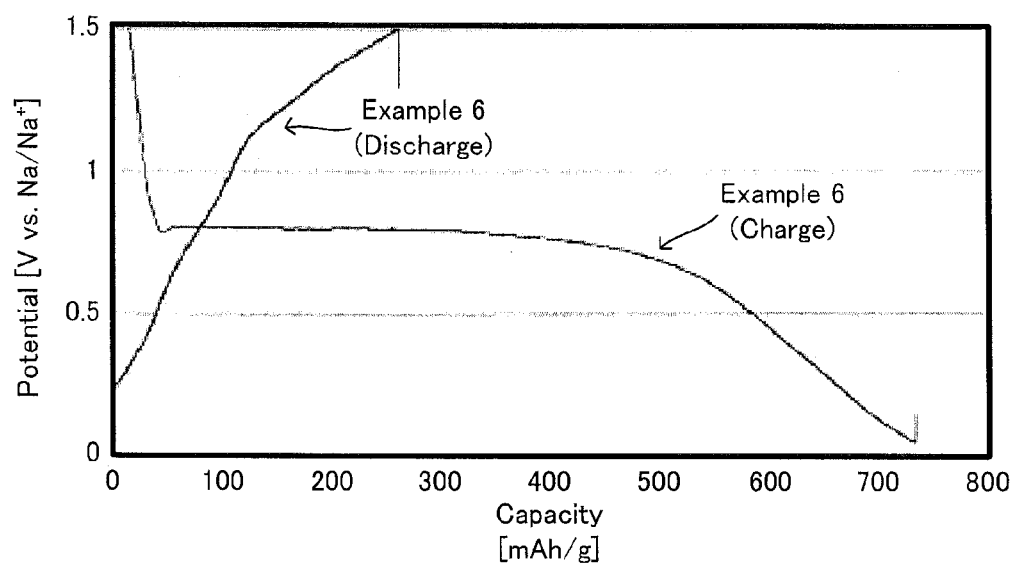
FIG. 8 is a graph showing results of constant current charge-discharge of a sodium-ion secondary battery prepared with the powder of Example 4.

As shown in FIG. 8, the battery of Example 6 operated stably in a range of 0.05V or more to 1.5V or less on the basis of sodium electrode potential. Also, the battery of Example 6 had 260 mAh/g or more of discharging capacity. That is, the battery of Example 6 was capable to increase battery safety since it can operate in a potential range in which metal sodium does not deposit, and at the same time capable to increase energy density than that of a battery prepared with a hard carbon.

<Battery Performance Measurement>

Constant current charge-discharge was carried out to the battery prepared with the powder of Example 5 produced by the same step of Example 3, under a temperature of 25° C., with a load current of 70 mA/g (active material), a voltage range of 0.05V or more to 1.5V or less (on the basis of sodium electrode potential). Result of the first cycle of the battery of Example 7 is shown in FIG. 9.

Figure 9:
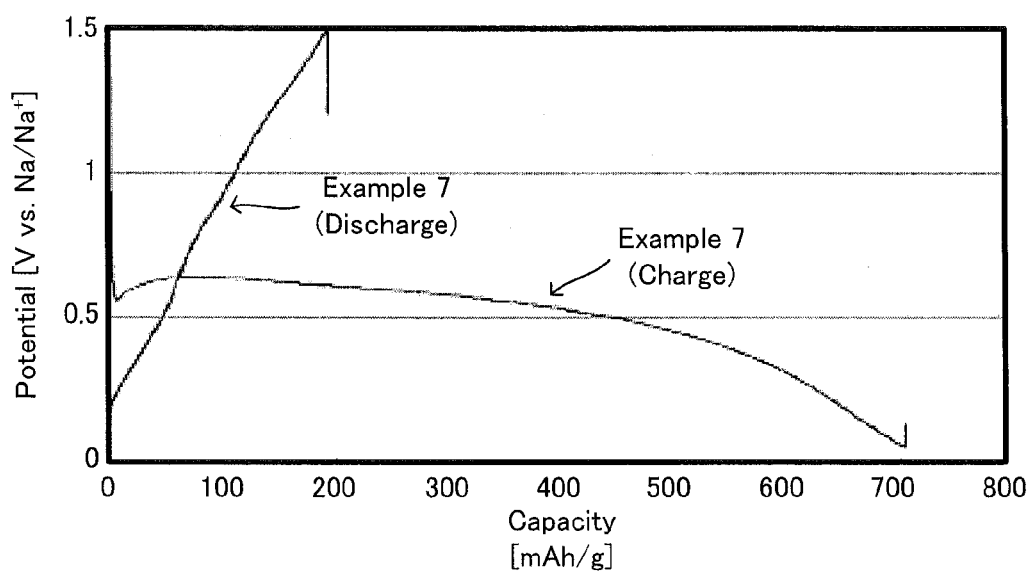
FIG. 9 is a graph showing results of constant current charge-discharge of a sodium-ion secondary battery prepared with the powder of Example 5.

As shown in FIG. 9, the battery of Example 7 operated stably in a range of 0.05V or more to 1.5V or less on the basis of sodium electrode potential. Also, the battery of Example 7 had 190 mAh/g or more of discharging capacity. That is, the battery of Example 7 was capable to increase battery safety since it can operate in a potential range in which metal sodium does not deposit, and at the same time capable to increase energy density than that of a battery prepared with a hard carbon.

The invention claimed is:

1. A metal ion battery comprising a cathode, an anode, and an electrolyte filled between the cathode and the anode, the electrolyte conducting a metal ion(s), wherein the anode contains at least one anode active material selected from the group consisting of $NaAl_{3.0}(SO_4)_{2.2}(OH)_{5.6} \cdot 0.30H_2O$, $NaAl_{1.1}Fe_{1.6}(SO_4)_2(OH)_{5.1} \cdot 0.12H_2O$, natrojarosite and $KFe_3(SO_4)_2(OH)_6$.

2. The metal ion battery according to claim 1, wherein the metal ion is a lithium ion.

3. The metal ion battery according to claim 1, wherein the metal ion is a sodium ion.

4. The metal ion battery according to claim 1, wherein the anode active material comprises $NaAl_{3.0}(SO_4)_{2.2}(OH)_{5.6} \cdot 0.30H_2O$.

5. The metal ion battery according to claim 1, wherein the anode active material comprises $NaAl_{1.1}Fe_{1.6}(SO_4)_2(OH)_{5.1} \cdot 0.12H_2O$.

6. The metal ion battery according to claim 1, wherein the anode active material comprises natrojarosite.

7. The metal ion battery according to claim 1, wherein the anode active material comprises $KFe_3(SO_4)_2(OH)_6$.

8. An anode composition comprising an anode active material and at least one of a solid electrolyte, a binder and an electrical conductive material, wherein the anode active material comprises at least one material selected from the group consisting of $NaAl_{3.0}(SO_4)_{2.2}(OH)_{5.6} \cdot 0.30H_2O$, $NaAl_{1.1}Fe_{1.6}(SO_4)_2(OH)_{5.1} \cdot 0.12H_2O$, natrojarosite and $KFe_3(SO_4)_2(OH)_6$.

9. The anode composition according to claim 8, wherein the anode active material comprises $NaAl_{3.0}(SO_4)_{2.2}(OH)_{5.6} \cdot 0.30H_2O$.

10. The anode composition according to claim 8, wherein the anode active material comprises $NaAl_{1.1}Fe_{1.6}(SO_4)_2(OH)_{5.1} \cdot 0.12H_2O$.

11. The anode composition according to claim 8, wherein the anode active material comprises natrojarosite.

12. The anode composition according to claim 8, wherein the anode active material comprises $KFe_3(SO_4)_2(OH)_6$.

* * * * *